(12) United States Patent
Arnold et al.

(10) Patent No.: US 7,089,260 B2
(45) Date of Patent: Aug. 8, 2006

(54) DATABASE OPTIMIZATION APPARATUS AND METHOD

(75) Inventors: Jeremy Alan Arnold, Rochester, MN (US); Eric Lawrence Barsness, Pine Island, MN (US); Richard Dean Dettinger, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 10/075,651

(22) Filed: Feb. 14, 2002

(65) Prior Publication Data

US 2003/0154216 A1   Aug. 14, 2003

(51) Int. Cl.
*G06F 17/30* (2006.01)
(52) U.S. Cl. ...................................... 707/102; 707/101
(58) Field of Classification Search ............. 707/1–10, 707/100–104.1, 200–206; 715/523
See application file for complete search history.

(56) References Cited

U.S. PATENT DOCUMENTS

| | | | | |
|---|---|---|---|---|
| 5,226,161 A | * | 7/1993 | Khoyi et al. ................. | 719/316 |
| 6,009,428 A | * | 12/1999 | Kleewein et al. ............. | 707/10 |
| 6,418,451 B1 | * | 7/2002 | Maimone ..................... | 707/200 |
| 6,484,185 B1 | * | 11/2002 | Jain et al. .................... | 707/203 |
| 6,529,901 B1 | * | 3/2003 | Chaudhuri et al. ............ | 707/3 |
| 6,658,625 B1 | * | 12/2003 | Allen ........................... | 715/523 |
| 6,678,700 B1 | * | 1/2004 | Moore et al. ................. | 707/200 |
| 6,694,325 B1 | * | 2/2004 | Jas .............................. | 707/102 |
| 6,745,176 B1 | * | 6/2004 | Probert et al. ................ | 707/2 |
| 2003/0033317 A1 | * | 2/2003 | Ziglin ......................... | 707/102 |

* cited by examiner

Primary Examiner—Jeffrey Gaffin
Assistant Examiner—Yicun Wu
(74) Attorney, Agent, or Firm—Martin & Associates, LLC; Derek P. Martin

(57) ABSTRACT

A database optimizer collects statistics regarding which types of applications are accessing the database, and makes one or more changes to the database schema to optimize performance according to the collected statistics. In a first embodiment, the optimizer detects when a certain type of application accesses the database a percentage of time that exceeds a predefined threshold level, and if the data in the database is stored in a less-than-optimal format for the application, the data type of one or more columns in the database is changed to a more optimal format for the application. This means that the database optimizer must recognize when a different type of application requests data from any changed column, and must potentially perform a conversion from the new data type to the old data type before returning the requested data. In a second embodiment, the optimizer detects when one type of application accesses a column a percentage of time that exceeds a first predefined threshold level and that accesses the column a percentage of time that is less than a second predefined threshold level. In this case, a new column is created in the database so the data is present in both formats, thereby optimizing the performance of both old and new applications that access the data. The database optimizer looks at what type of application requested data, and returns the data in the format optimized for that type of application.

20 Claims, 10 Drawing Sheets

Select * from Table1 where C1=4
AND (C2>6 OR C3!=8)

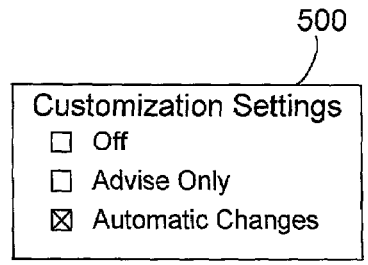
FIG. 5
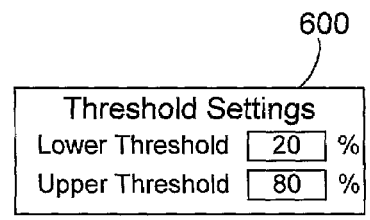
FIG. 6
| char(20) name | packed decimal (6,0) id |
|---|---|
| John Smith | 345987 |
| Jane Jones | 478921 |
| Bob Johnson | 157346 |
FIG. 7
| Char(20) name | packed decimal (6,0) id | unicode(20) name_ref | int id_ref |
|---|---|---|---|
| John Smith | 345987 | * | + |
| Jane Jones | 478921 | * | + |
| Bob Johnson | 157346 | * | + |
FIG. 8

1200

| SchemaName | TableName | TableOwner | Column Count | Contains Reflection |
|---|---|---|---|---|
| EmpSchema | Employee | user profile | 2 | False |
| ... | ... | ... | ... | ... |
| Schema2 | Table3 | Owner4 | 5 | False |

| Column Name | Table Name | Schema Name | Data Type | Column Size | Is Reflective Column | Reflective for Column | Optimized for Paradigm |
|---|---|---|---|---|---|---|---|
| name | Employee | EmpSchema | char | 20 | False | Null | COBOL |
| id | Employee | EmpSchema | packed decimal | (6,0) | False | Null | COBOL |

| SchemaName | TableName | TableOwner | Column Count | Contains Reflection |
|---|---|---|---|---|
| EmpSchema | Employee | user profile | 2 | True |
| ... | ... | ... | ... | ... |
| Schema2 | Table3 | Owner4 | 5 | False |

| Column Name | Table Name | Schema Name | Data Type | Column Size | Is Reflective Column | Reflective for Column | Optimized for Paradigm |
|---|---|---|---|---|---|---|---|
| name | Employee | EmpSchema | char | 20 | True | name_ref | COBOL |
| id | Employee | EmpSchema | packed decimal | (6,0) | True | id_ref | COBOL |
| name_ref | Employee | EmpSchema | unicode | 20 | True | name | Java |
| id_ref | Employee | EmpSchema | int | 6 | True | id | Java |

| SchemaName | TableName | TableOwner | Column Count | Contains Reflection |
|---|---|---|---|---|
| EmpSchema | Employee | user profile | 2 | False |
| ... | ... | ... | ... | ... |
| Schema2 | Table3 | Owner4 | 5 | False |

| Column Name | Table Name | Schema Name | Data Type | Column Size | Is Reflective Column | Reflective for Column | Optimized for Paradigm |
|---|---|---|---|---|---|---|---|
| name | Employee | EmpSchema | unicode | 20 | False | Null | Java |
| id | Employee | EmpSchema | int | 6 | False | Null | Java |

1310  1320  1330

DATABASE OPTIMIZATION APPARATUS AND METHOD

BACKGROUND OF THE INVENTION

1. Technical Field

This invention generally relates to computer systems, and more specifically relates to apparatus and methods for accessing data in a computer database.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Many databases include data that has existed for decades, often outliving the software applications that originally created the data. New applications are often developed that need to access the data. The way that data is stored in a database affects the performance of applications that access the data. If the data is stored as a particular data type, but an application requires a different data type, the data must typically be read, then converted to the desired data type. This problem arises, for example, when data that was originally created by legacy applications in one data type now needs to be accessed by new languages and APIs that expect a different data type.

Legacy applications often store integer data in fields that are in a format known as PACKED DECIMAL, which is one way to represent numeric data. Like the PACKED DECIMAL data type, the data types SMALLINT, INTEGER, and BIGINT are other alternative ways to represent numeric data. In a Java and JDBC programming paradigm, it is widely recognized that retrieval of data from database columns that have a type of SMALLINT, INTEGER, or BIGINT will perform significantly better than retrieval of data from a column that has a type PACKED DECIMAL. The format of the data stored in the database results in performance penalties for any application that needs to access the data, but could run faster if the data were of a different type. Changing the data type to accommodate the new applications is generally not an acceptable option, because changing the data type would require significant manual rework. This problem is especially apparent as companies with existing applications and databases become internet-enabled, which is commonly done using Java to access data in existing databases. Using Java to access data in less-than-optimal data types in older databases results in performance penalties that are significant. Without an apparatus and method that allows a database to dynamically evolve according to the applications accessing its data, the computer industry will continue to suffer from excessive overhead in porting existing data to new applications, such as web-enabled applications.

DISCLOSURE OF INVENTION

According to the preferred embodiments, a database optimizer collects statistics regarding which types of applications are accessing the database, and makes one or more changes to the database schema to optimize performance according to the collected statistics. In a first embodiment, the optimizer detects when a certain type of application accesses the database a percentage of time that exceeds a predefined threshold level, and if the data in the database is stored in a less-than-optimal format for the application, the data type of one or more columns in the database is changed to a more optimal format for the application. This means that the database optimizer must recognize when a different type of application requests data from any changed column, and must potentially perform a conversion from the new data type to the old data type before returning the requested data. In a second embodiment, the optimizer detects when one type of application accesses a column a percentage of time that exceeds a first predefined threshold level and that accesses the column a percentage of time that is less than a second predefined threshold level. In this case, a new column is created in the database so the data is present in both formats, thereby optimizing the performance of both old and new applications that access the data. The database optimizer looks at what type of application requested data, and returns the data in the format optimized for that type of application.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 5 is a sample menu display window that allows a user to set customization settings for the database manager of the preferred embodiments;

FIG. 6 is a sample menu display window that allows a user to set threshold levels that determine the function of the database manager of the preferred embodiments;

FIG. 7 is a sample employee table for illustrating the function of the database manager of the preferred embodiments;

FIG. 8 is the employee table of FIG. 7 after adding reflective columns for each of the columns in FIG. 7;

FIGS. 12 and 13 represent the table of tables and table of columns, respectively, that make up the metadata for the employee table in FIG. 7 in accordance with the preferred embodiments;

FIGS. 14 and 15 represent the table of tables and table of columns, respectively, that make up the metadata for the employee table in FIG. 8 in accordance with the preferred embodiments;

FIGS. 16 and 17 represent the table of tables and table of columns, respectively, that make up the metadata for the employee table in FIG. 9 in accordance with the preferred embodiments;

BEST MODE FOR CARRYING OUT THE INVENTION

1.0 Overview

The present invention relates to optimizing the performance of accessing data in a database. For those not familiar with databases, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figures 2, 3:
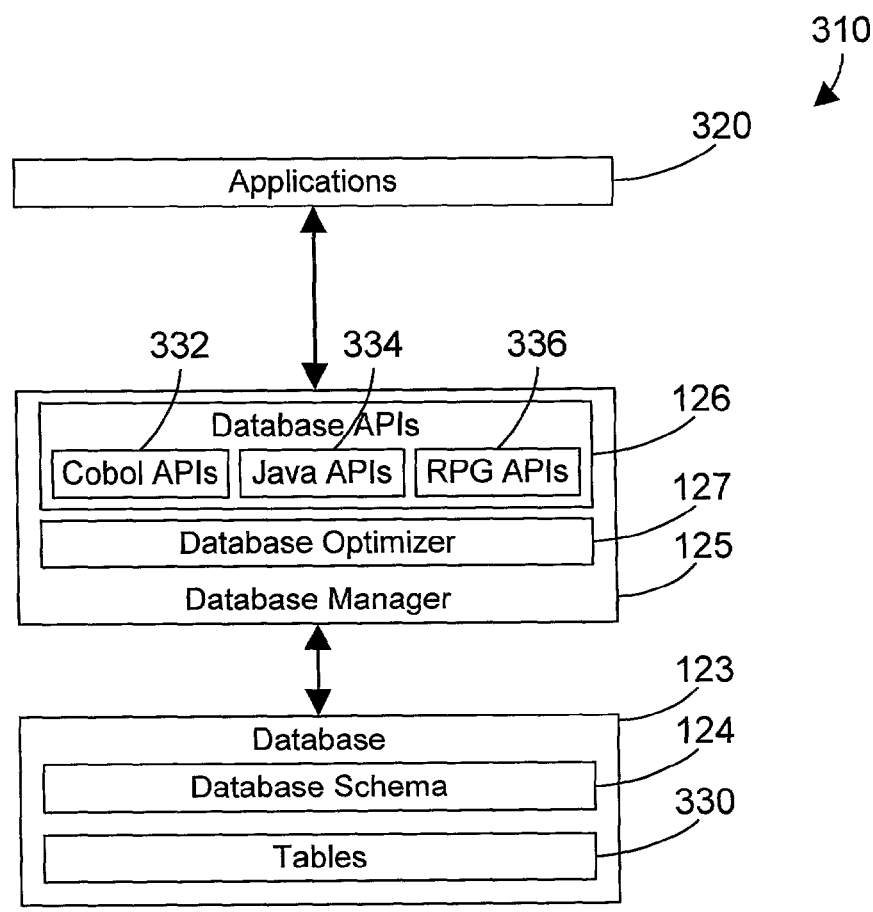
FIG. 2 is a sample database query in Structured Query Language (SQL)
FIG. 3 is a block diagram showing the relationship between the database and database manager of FIG. 1, and between the database manager and applications that need to access the database.

One popular way to define a query uses Structured Query Language (SQL). SQL defines a syntax for generating and processing queries that is independent of the actual structure and format of the database. One sample SQL query is shown in FIG. 2. The "select*" statement tells the database query processor to select all columns, the "from Table1" statement identifies which database table to search, and the "where" clause specifies one or more expressions that must be satisfied for a record to be retrieved. Note that the query of FIG. 2 is expressed in terms of columns C1, C2 and C3. Information about the internal storage of the data is not required as long as the query is written in terms of expressions that relate to values in columns from tables.

For the query of FIG. 2, the "where" clause specifies that the first column has a value equal to four (C1=4) logically ANDed with the expression that the second column is greater than six OR the third column is not equal to eight. In the prior art, much effort has been expended to optimize queries so they may be executed faster, which increases system performance. However, no known efforts have been made to dynamically change a database's schema according to the type of applications accessing the database, the frequency with which the application access data in the database, and the location of the data in the database accessed by the applications.

2.0 Detailed Description

The preferred embodiments provide a way to dynamically tune a database to provide data in a format optimized for the type of application that most frequently accesses the data.

Figure 1:
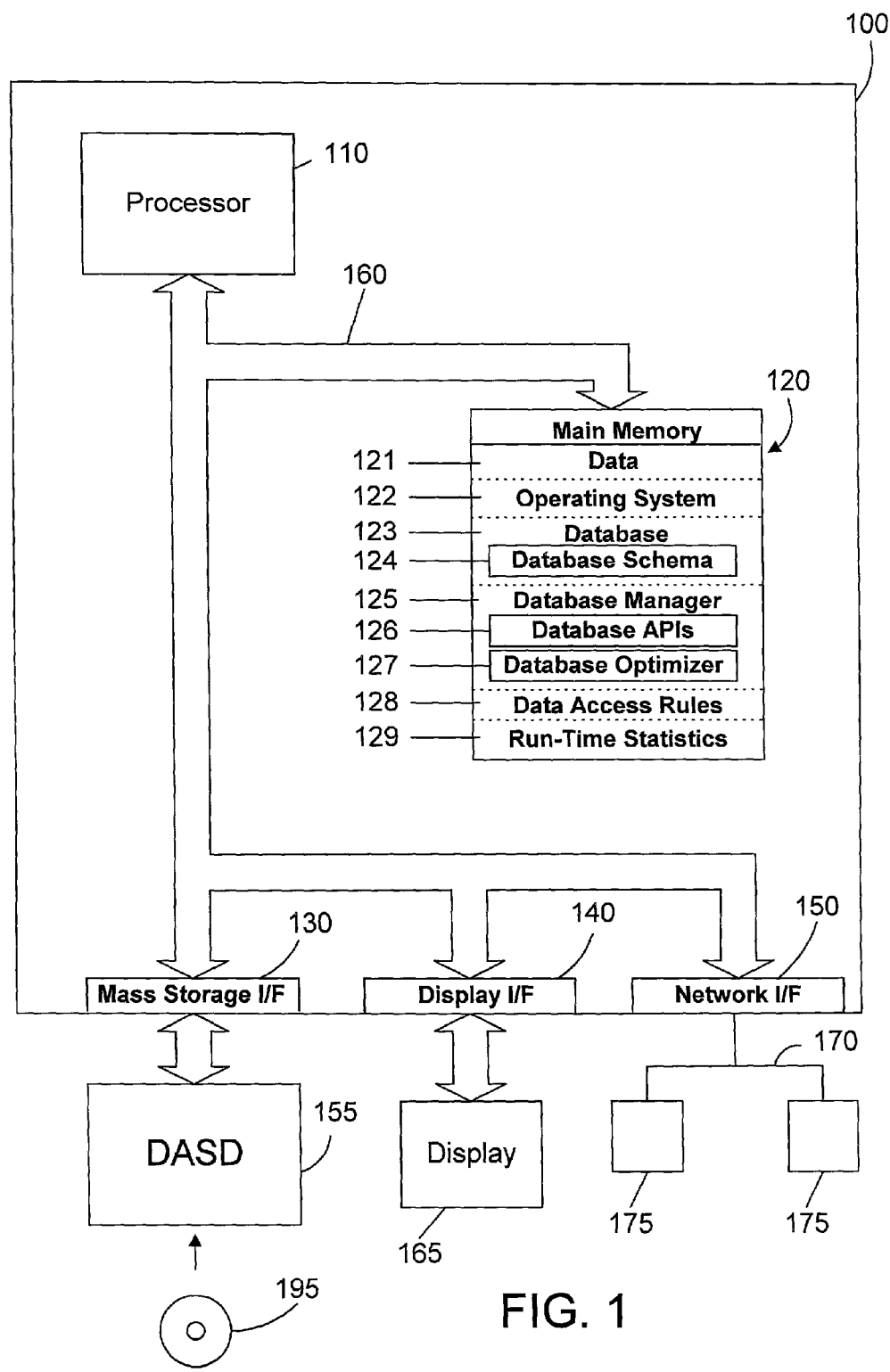
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD ROM drive, which may store data to and read data from a CD ROM 195.

Main memory 120 in accordance with the preferred embodiments contains data 121, an operating system 122, a database 123, a database manager 125, data access rules 128, and run-time statistics 129. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 comprises any suitable table or collection of tables defined by database schema 124. Database manager 125 suitably includes one or more database APIs 126 and a database optimizer 127. Database APIs 126 are the application programming interfaces (APIs) that applications may use to access data stored within database 123. In the preferred embodiments, each type of programming paradigm includes its own set of APIs for accessing data in the database 123. Data access rules 128 correlate a programming paradigm (such as COBOL or Java) to its preferred data types. Run-time statistics 129 contain statistics that indicate the relative frequency with which each programming paradigm accesses data in a particular portion of the database 123 (such as a selected column or columns). Database optimizer 127 monitors the data access rules 128 and the run-time statistics 129, and makes one or more changes to the database schema 124 to optimize the access of data in the database according to the run-time statistics 129. In some cases, the database optimizer 127 changes the data type of one or more columns in the database 123. In other cases, the database optimizer 127 adds reflective columns to the database 123 so that data within the database 123 is present in multiple data types at the same time. The database optimizer 127 then monitors which type of application requests access to the data (by determining which database API 126 is invoked), and retrieves data from a column in the database, if one exists, that stores the data in a data type that is optimized for the type of requesting application. Note that run-time statistics 129 may be collected by the database manager 125 within the scope of the preferred embodiments, or may be separately collected yet used by the database manager 125.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database manager 125, data access rules 128, and run-time statistics 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD ROM (e.g., 195 of FIG. 1), and transmission type media such as digital and analog communications links.

The remainder of this specification describes the detailed function of the database optimizer 127 shown in FIG. 1. Referring now to FIG. 3, a block diagram shows the relationship between the database 123, the database manager 125, and applications 320 that require access to data stored in the database 123. Database 123 is defined by a database schema 124 that specifies the details for each table 330 in the database 123, including the number of columns in the table, the width of each column, and the data type of each column. Note that the database schema 124 includes a definition for each and every type of table 330 stored in the database 123.

Figure 4:
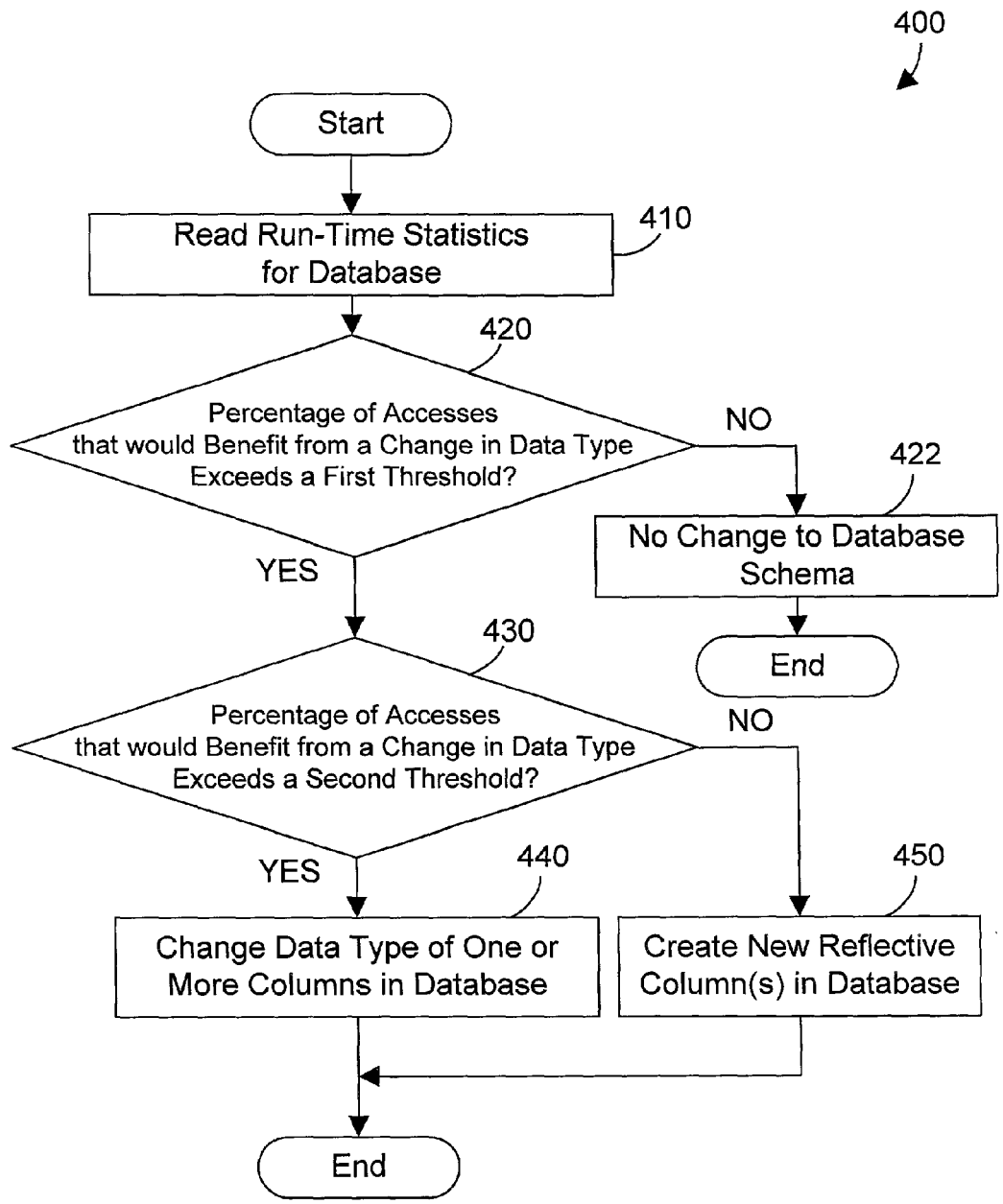
FIG. 4 is a flow diagram of a method in accordance with the preferred embodiments.

Database manager 125 is a layer of code that runs between the applications 320 that need to access data in the database 123 and the database 123 itself. Database manager 125 includes the database optimizer 127 shown in FIG. 1, and includes database APIs 126 that provide interfaces for applications 320 to access data in the database 123. In FIG. 4, examples of suitable APIs are shown to include one or more COBOL APIs 332, one or more Java APIs 334, and one or more RPG APIs 336. COBOL APIs 332 are application programming interfaces that provide an interface for COBOL applications to access data stored in database 123. Java APIs 334 are application programming interfaces that provide an interface for Java applications to access data stored in database 123. RPG APIs 336 are application programming interfaces that provide an interface for RPG applications to access data stored in database 123. Of course, these specific APIs 332, 334 and 336 in FIG. 3 are shown by way of example, and the preferred embodiments expressly extend to any suitable API or other type of interface that allows an application to access data stored within database 123.

Applications 320 include all applications that may access data within the database 123. From the specific APIs 332, 334 and 336 shown in FIG. 3, we assume that applications 320 would include COBOL applications, Java applications, and RPG applications. In the preferred embodiment, each type of application will have its own set of APIs that is uses to access data in the database 123. Note, however, that an application of a particular type may access data in the database 123 using an API intended for a different application, so long as the application itself includes the logic to perform any needed conversion between the data returned by the API.

Referring now to FIG. 4, a method 400 in accordance with the preferred embodiments shows how the database optimizer 127 may dynamically make changes to a database to tune the performance of the database according to the type of applications that are accessing its data. First, the run-time statistics for the database are read (step 410). Note that the run-time statistics are preferably collected by the database optimizer 127, but may also be collected by a separate software tool or application as well. Method 400 determines from the statistics if the percentage of accesses by a particular type of application that would benefit a change of data type exceeds a first threshold (step 420). If not (step 420=NO), no change is made to the database (step 422). If so (step 420=YES), method 400 checks to see if the percentage of accesses by a particular type of application that would benefit from a change of data type exceeds a second threshold (step 430). If not (step 430=NO), one or more new reflective columns are created in the database (step 450). If so (step 430=YES), the data type of one or more columns in the database is changed (step 440). In this manner, method 400 makes appropriate changes to the database in steps 440 and 450 that will make accesses to the data stored in the database perform better according to the percentage of accesses by different types of applications. Note that the changes are determined by the first and second thresholds levels, which may be fixed, but are preferably variable and can be set by the database administrator.

Note that the changes to the database performed by the database optimizer 127 in method 400 of FIG. 4 are changes to data types for columns in the database (in step 440), and the addition of columns in the database (step 450). Note also that the database optimizer 127 may also delete reflective columns once they are no longer needed. These types of changes to the database are describe herein in two different ways. First, these are describe as changes to the database (as in FIG. 4). Alternatively, these changes are described as changes to the database schema (as in the claims). Note that these are different ways of saying the same thing, since the database schema dictates the physical structure and organization of the database. Columns can only be added to a table by changing the schema for the table. The data type of a column can only be changed by changing the schema that specifies the data type for the column. For this reason, the terms "changing the database" and "changing the database schema" are considered equivalent, and no difference between these terms exists for the purposes of describing the preferred embodiments or claims herein.

In the preferred embodiments, the database administrator has the ability to dictate how the database optimizer 127 functions. Referring to FIG. 5, a menu display window 500 allows the database administrator to select whether the database optimizer is turned off, is put in an "advise only" mode, or is enabled to make changes to the database automatically. If turned off, the database optimizer 127 does not perform any of the optimization functions described herein as part of the preferred embodiments. If in "advise only" mode, the database optimizer 127 shows to the database administrator what changes the database optimizer 127 would have made to optimize performance of the database if automatic changes were enabled. If automatic changes are enabled (as shown by the check in the box in FIG. 5), the database optimizer 127 automatically makes the changes to the database to optimize its performance according to the applications accessing its data, as shown by method 400 in FIG. 4. In addition to setting the database optimizer 127 to "off", "advise only", or "automatic changes" as shown in FIG. 5, the database administrator may also select the lower and upper threshold levels that control how the database optimizer 127 performs its functions, as shown in FIG. 6. The lower threshold determines when the database optimizer 127 can first take action to optimize the database for accesses by a particular type of application. The upper threshold determines when the accesses by a particular type of application become so dominant that it justifies changing the data type of one or more columns in the database to accommodate the dominant type of application. For the specific example of FIG. 6, the lower threshold is set to 20%, while the upper threshold is set to 80%. The fact that these two threshold levels in FIG. 6 sum to 100% is coincidental; any suitable values may be independently selected for the first and second threshold values so long as the upper threshold value is equal to or greater than the lower threshold value.

Once a type of application that would benefit from a change of data type exceeds 20% of the accesses to data within a particular column, the database optimizer may take action to optimize the database. If the type of application has a number of accesses between the lower and upper thresholds (between 20% and 80% for the example in FIG. 6), reflective columns will be added to the database to provide data in multiple data types for multiple application types. Once the number of accesses for a particular application type exceeds the upper threshold, the data type of the columns in the database are changed to be optimized for the particular application. Note that the data access rules 128 in FIG. 1 correlate a type of application to its preferred data types that will optimize performance for that particular type of application.

It is important to note what happens when data is stored in a less-than-optimal format in the database, and no reflective columns are present to provide an alternative data type for the data. This happens when the number of accesses by an application type is lower than the lower threshold, or is greater than the upper threshold. When an application type has a percentage of accesses lower than the lower threshold, the database optimizer 127 will not perform optimizations to the database 123. Note, however, that the database manager 125 will still return data in a format expected by a requesting application by detecting which database API 126 was invoked, and by either returning the data (if already of the desired data type), or automatically converting the data to the desired data type before returning the data to the requesting application. Note that the correlation between a particular type of application and its preferred data types is stored in the data access rules 128. When an application type has a percentage of accesses greater than the upper threshold, the data type of one or more columns in the database will be changed to the preferred data types for that type of application. Other types of applications that now request data from these columns expect a different data type. Again, the database manager 125 accounts for this mismatch between data types, and performs a conversion between data types before returning the data to the requesting application. In this manner, the data type preferred by the type of requesting application is always returned, and when no conversion is necessary, the performance of the API returning the data is significantly increased. Note that the data conversion may be performed by the database optimizer 127, or may be performed by a different portion of code within the database manager 125.

Note that the lower and upper thresholds discussed herein can be either inclusive or exclusive of their boundary limits within the scope of the preferred embodiments. Thus, we discuss the function of the database optimizer 127 in method 400 of FIG. 4 as taking certain actions based on whether the percentage of accesses exceeds a first threshold (step 420) or exceeds a second threshold (step 430). Note that these steps could have alternatively been specified to evaluate whether the percentage of accesses is greater than or equal to the first and second thresholds. There is no specific importance regarding where the lines are drawn and whether the conditions are true when the percentage of accesses is equal to the set threshold levels. The preferred embodiments expressly extends to any manner of defining a lower threshold and an upper threshold, and for taking appropriate steps according to those defined threshold levels, regardless of whether the boundary limits defined by the threshold levels are included or excluded in the ranges.

A very simple example is now presented to illustrate the function of the database optimizer 127. Referring to FIG. 7, a table 700 is a very simple database table referred to as an Employee table that stores the name of a company's employees and their corresponding employee identification numbers. The employee table 700 includes a first column 710 that has a data type of char(20) and a label of "name", and a second column 720 that has a data type of packed decimal (6,0) and a label of "id". These data types are the preferred data types for a COBOL application, and we assume that table 700 was originally created using a COBOL application. Now, let's assume that the company wants to make the employee and identification numbers available to Java applications as well as COBOL applications. In the prior art, when a Java application accesses the data in table 700, the database manager 125 would convert the data from its stored data type to data types that Java expects. In the preferred embodiments, the database manager 125 also performs the conversion between data types by knowing what kind of application is requesting the data by determining which database API 126 was invoked, and by looking at the data access rules 128 that correlate a type of application to its preferred data types. With this information, the database manager 125 returns the preferred data type to the requesting application. It has been shown by extensive experience that Java processes unicode much more efficiently than character text, and processes integers much more efficiently than packed decimals. We therefore assume that the data access rules 128 list char and packed decimal as preferred data types for COBOL applications, while unicode and int are preferred data types for Java applications. We assume for this example that the lower and upper threshold levels are set at 20% and 80%, respectively, as shown in FIG. 6. For these threshold levels, for any percentage of accesses to a column by Java applications that are less than 20%, the database manager simply retrieves the data as stored in the table of FIG. 7, and performs the conversion between the retrieved data types and the preferred data types for Java (namely, unicode and int). For the table 700 of FIG. 7, a COBOL application requests access to the "name" column in table 700 by invoking a COBOL API (e.g., COBOL API 332 of FIG. 3). The database manager 125 detects that a COBOL API was invoked, and looks at the data access rules 128 to determine that the preferred data type for text is char. The database manager 125 then looks at the database schema 124 to determine if a column in table 700 has the "name" information in "char" format. Column 710 has the "name" information in "char" format, so data from column 710 is returned. In similar fashion, a Java application requests access to the "name" column in table 700 by invoking a Java API (e.g., Java API 334 of FIG. 3). The database manager 125 detects that a Java API was invoked, and looks at the data access rules 128 to determine that the preferred data type for text is unicode. The database manager 125 then looks at the database schema 124 to determine if a column in table 700 has the "name" information in "unicode" format. There is no column in table 700 that has the "name" information in "unicode" format, so the database manager 125 retrieves the char(20) data from column 710, converts the char(20) data to unicode(20) data, and returns the unicode(20) data to the requesting Java application. In this manner, the database manager 125 automatically converts from a stored data type to data type desired by the requesting application, when needed. However, the most significant advantage of the preferred embodiments is the reduction in the percentage of times a conversion is needed by changing the database schema to store data in one or more formats compatible with the type of applications that access the data most frequently.

Referring back to FIG. 4, once the percentage of accesses for a particular type of application that would benefit from a change in data type exceeds a first threshold (e.g., the lower threshold of 20%), the database optimizer 127 may take action to optimize the database by changing the database. If the percentage of accesses for the type of application lies between the first and second threshold levels (e.g., between the lower threshold of 20% and the upper threshold of 80%), reflective columns are created in the database (step 450 of FIG. 4). Once the percentage of accesses for the type of application exceeds the second threshold (e.g., is greater than 80%), some of the reflective columns are deleted, leaving only the columns that contain the data type for the dominant type of application accessing the data.

Let's say that the percentage of accesses for Java applications for both the name and id columns in table 700 is 30%. This lies between the lower threshold of 20% and the upper threshold of 80%, so the database optimizer 127 creates reflective columns (step 450 in FIG. 4), as shown in table 700A of FIG. 8. Note that the first two columns are the same columns 710 and 720 in FIG. 7. However, two new columns 810 and 820 are added that have different names and data types. Column 810 of table 700A has a data type of unicode(20), and has a label of "name_ref". The data in column 810 is represented by asterisks "*" to indicate that the data in this column is identical to the data in the "name" column 710, only it is stored in unicode(20) format rather than char(20) format. Similarly, the fourth column 820 of table 700A has a data type of int, and has a label of "id_ref". The data in column 820 is represented by plus signs "+" to indicate that the data in this column is identical to the data in the "id" column, only it is stored in int format rather than packed decimal (6,0) format. Note that columns 710 and 810 are said to be "reflective" columns because they reflect the same data in different data types (or formats). Similarly, columns 720 and 820 are reflective columns.

A COBOL application requests access to the "name" column in table 700A by invoking a COBOL API (e.g., COBOL API 332 of FIG. 3). The database manager 125 detects that a COBOL API was invoked, and looks at the data access rules 128 to determine that the preferred data type for text is char. The database manager 125 then looks at the database schema 124 to determine which column in table 700A has the "name" information in "char" format. Column 710 is the appropriate column, so data from column 710 is returned. In similar fashion, a Java application requests access to the "name" column in table 700A by invoking a Java API (e.g., Java API 334 of FIG. 3). The database manager 125 detects that a Java API was invoked, and looks at the data access rules 128 to determine that the preferred data type for text is unicode. The database manager 125 then looks at the database schema 124 to determine which column in table 700A has the "name" information in "unicode" format. Column 810 is the appropriate column, so data from column 810 is returned. In this manner, data may be stored in multiple data types (or formats) in the preferred embodiments to allow efficiently returning data in a format that the requesting application expects.

We now assume for our example that the percentage of accesses by Java applications to one or more columns in table 700A of FIG. 8 rises above the upper threshold level of 80%. In this case, the database manager deletes the original columns 710 and 720 from table 700A, and renames the columns 810 and 820 to the names of the original columns (i. e., "name" and "id"), as shown in table 700B in FIG. 9. Now, when a COBOL application requests access to the "name" column in table 700 by invoking a COBOL API (e.g., COBOL API 332 of FIG. 3), the database manager 125 detects that a COBOL API was invoked, and looks at the data access rules 128 to determine that the preferred data type for text is char. The database manager 125 then looks at the database schema 124 to determine if a column in table 700B has the "name" information in "char" format. There is no column in table 700 that has the "name" information in "char" format, so the database manager 125 retrieves the unicode(20) data from column 810, converts the unicode (20) data to char(20) data, and returns the char(20) data to the requesting COBOL application. In similar fashion, a Java application requests access to the "name" column in table 700B by invoking a Java API (e.g., Java API 334 of FIG. 3). The database manager 125 detects that a Java API was invoked, and looks at the data access rules 128 to determine that the preferred data type for text for a Java request is unicode. The database manager 125 then looks at the database schema 124 to determine if a column in table 700B has the "name" information in "unicode" format. Column 810 has the "name" information in "unicode" format, so data from column 810 is returned. In this manner, the database optimizer 127 causes the database 123 to automatically evolve according to the types of applications requesting data from the database. Note that the data optimizer 127 may operate on the column level, which means that accesses may be tracked to particular columns, and appropriate changes as described in method 400 of FIG. 4 may be performed on individual columns in a table without affecting other columns in the table. This allows the optimizer 127 to only build a reflective column if the run-time statistics 129 indicate a percentage of accesses to that particular column exceeds the first threshold level.

Figure 10:
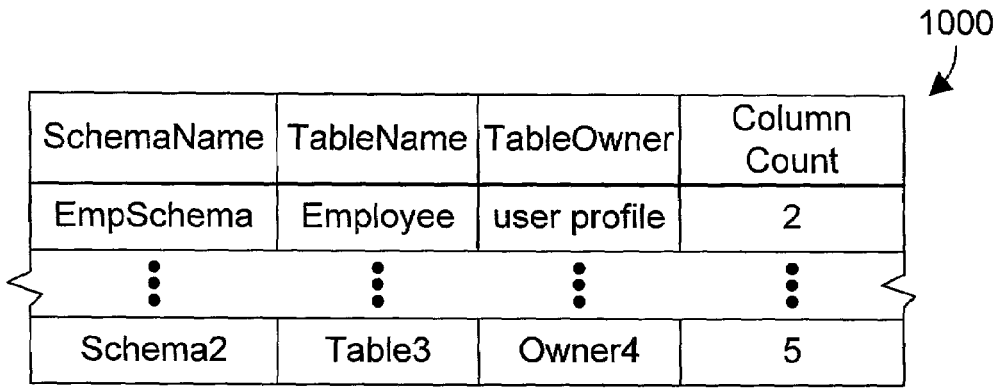
FIG. 10 is a table of tables that represents prior art metadata for the employee table of FIG. 7.

One significant advantage of the preferred embodiments is the definition of different levels of metadata. In the prior art, the database administrator may review metadata that shows how data is stored in the database. The metadata is representative of the database schema. In the prior art, metadata for a database is typically stored in two tables, one to track the tables in the database, and another to track columns in the tables. Referring to FIG. 10, table 1000 is table that shows a very simplified representation of metadata for tables in a simple database. Each entry in table 1000 represents a different table in the database. The SchemaName column references the schema for that particular table. The TableName column contains the name of the table. The TableOwner column identifies who the owner is for the table. The ColumnCount column indicates how many columns are in the table. For the simple table 1000 in FIG. 10, two tables are shown, the first being the Employee table 700 of FIG. 7, and the second being a table called Table3. Of course, other tables can also exist within the database represented by the metadata in table 1000. The Employee table is assumed to have a schema labeled "EmpSchema", and its owner is specified by the user profile of the owner. As shown in table 700 of FIG. 7, the Employee table has two columns.

Figure 11:
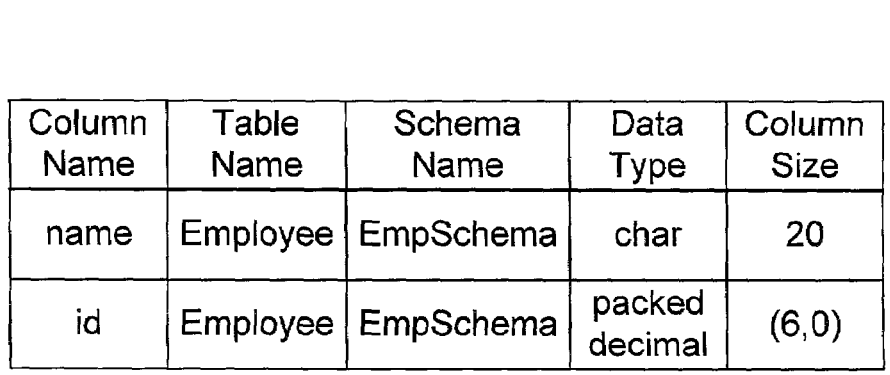
FIG. 11 is a table of columns in the employee table that represents prior art metadata for the employee table of FIG. 7.

Referring now to FIG. 11, a table 1100 represents a table of columns that shows metadata for the columns in the Employee table, but could also include metadata for columns in other tables as well. As shown in FIG. 11, the "name" column in the Employee table 700 has a data type of char and a size of 20. The "id" column in the Employee table 700 has a data type of packed decimal and a size of (6,0). The table of tables 1000 in FIG. 10 and the table of columns 1100 in FIG. 11 together make up metadata as known in the prior art that describes the employee table of FIG. 7.

In the preferred embodiments, the metadata is changed to accommodate the possibility of adding reflective columns. For table 700 of FIG. 7, the preferred embodiments have a table of tables 1200 shown in FIG. 12 and a table of columns 1300 shown in FIG. 13. The table of tables 1200 includes an additional column 1210 when compared to the prior art table of tables 1000 in FIG. 10 that contains a flag to indicate whether or not the table contains reflective columns. Table 700 of FIG. 7 does not contain reflective columns, so this flag is set to FALSE for the Employee table. The table of columns 1300 in FIG. 13 contains three new columns 1310, 1320 and 1330. Column 1310 contains a flag that indicates whether the column is a reflective column. Column 1320 contains the name of the column for which this column is reflective, or contains "null" if the column is not a reflective column. Column 1330 contains the name of a paradigm for which this column is optimized. Because table 700 in FIG. 7 was created by a COBOL application that prefers char(20) and packed decimal(6,0) format, the column was optimized for the COBOL programming paradigm. Note that for both the name and id columns in table 700 of FIG. 7, the metadata in the table of columns 1300 of FIG. 13 specifies that neither of these columns is reflective, and that they are optimized for COBOL.

Now we examine how the metadata changes when reflective columns are added. Table 700A in FIG. 8 contains reflective columns. The table of tables 1400 in FIG. 14 and the table of columns 1500 in FIG. 15 represent metadata that describes the table 700A in FIG. 8. Thus, column 1210 in the table of tables 1400 of FIG. 14 is set to TRUE for the Employee table to indicate that the Employee table includes reflective columns. Now we analyze the differences in the metadata in the table of columns 1500 shown in FIG. 15, which represents table 700A of FIG. 8. Because the "name" and "id" columns both have reflective columns "name_ref" and "id_ref", respectively, column 1310 in table 1500 of FIG. 15 are true for all columns in the Employee table. Column 1320 specifies which column in the table is the reflective column, and column 1330 specifies which paradigm the column is optimized for. Note that the names "name_ref" and "id_ref" are shown herein as examples of suitable names that would easily correlate reflective columns by the addition of a "_ref" suffix. However, the actual names of reflective columns would preferably be assigned by the database optimizer 127 in a way that would minimize the likelihood that such a name would be explicitly created by a user. For example, a suffix of "##$##" could be assigned by the database optimizer for reflective columns, which would minimize the likelihood of a user creating a column of this name. By providing metadata as shown in the table of tables 1400 and table of columns 1500, the database optimizer 127 may easily keep track of when reflective columns are present in a table, and which columns contain data in which data types. This allows the database optimizer to return the data type that matches the requesting application, when possible, when reflective columns exist.

Figure 9:
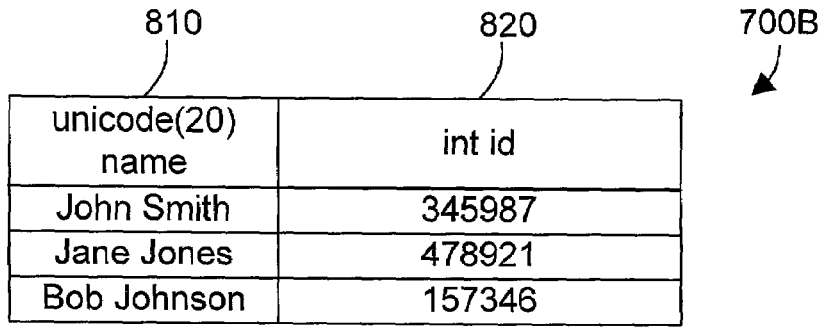
FIG. 9 is the employee table of FIG. 8 after deleting the original columns in FIG. 7.

The table of tables 1600 in FIG. 16 and the table of columns 1700 in FIG. 17 represent metadata that describes the table 700B in FIG. 9. Note that in table 700B the original columns 710 and 720 have been deleted, and the newer, Java-optimized columns 810 and 820 have been renamed to the names of the original columns. These changes are reflected in the metadata for this table. First, column 1210 in table 1600 that corresponds to the Employee table is set to False to indicate that no reflective columns are present in the Employee table. Next, the two entries in the table of columns 1700 relating to the COBOL data types have been deleted, and the column name of the remaining Java data types have been renamed to the original column names. Column 1310 for each of the remaining columns is False because there are no longer reflective columns in the table. Column 1320 for each of the remaining columns is Null, and column 1330 specifies that these columns are optimized for the Java programing paradigm.

The simple example presented herein that shows the evolution of table 700 in FIG. 7 to table 700A of FIG. 8 to table 700B of FIG. 9, along with the associated metadata and its changes in FIGS. 12–17, shows how the database optimizer 127 may cause a database to dynamically evolve according to which applications are accessing columns in the database and with what frequency. A database table optimized for COBOL (e.g., table 700 in FIG. 7) may be transformed to include reflective columns that provide increased performance for Java applications that need to access data in the table. Note that this increase in performance comes at the expense of additional storage space in the database. This is another feature that is subject to potential customization by a database administrator. For example, the database administrator could specify a maximum database size, or percent of database growth, that could be used for reflective columns. The database optimizer 127 could then create reflective columns so long as the maximum is not exceeded. In the case that creating additional reflective columns would exceed the specified maximum, the database optimizer 127 could also include heuristics to determine whether the current optimization of potentially adding reflective columns outweighs the benefits of reflective columns that currently exist, and can therefore delete some current reflective columns to make room for new reflective columns.

Once the percentage of accesses by Java applications exceeds a second threshold level, it is deemed that the benefit of the reflective columns is outweighed by the cost of the additional required storage, so the original columns are deleted, and the remaining columns are renamed to the names of the original columns. Now Java applications can directly access the data in the format they prefer, while COBOL applications will suffer the performance penalty of having the database manager perform the conversion between the Java-optimized data types and the COBOL-optimized data types. Note also that this evolution can work in both directions. If the database table evolves from table 700 in FIG. 7 to table 700A to FIG. 8 to table 700B in FIG. 9, this is not necessarily the end of the evolution. Let's assume that there are more COBOL applications added that access the data. In the alternative, let's assume that fewer Java applications access the data, perhaps because the data is available in a different table. Whatever the reason, if the percentage of accesses by COBOL applications exceeds the first threshold level (e.g., of 20%), reflective columns can be added to the table, and if the percentage of accesses by COBOL applications exceeds the second threshold level, the reflective columns could be deleted and the table would devolve back to its original state, as shown in table 700 in FIG. 7. The database optimizer of the preferred embodiments thus provides a way to dynamically tune a database according to the applications accessing data in the database.

Figure 18:
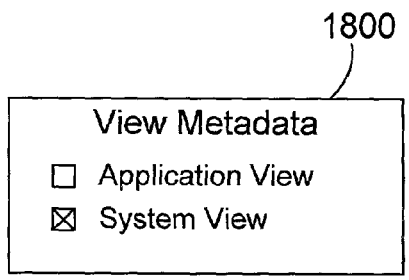
FIG. 18 is a sample menu display window that allows a user to select whether the application view metadata or system view metadata is displayed when a command to display the metadata is executed.

The presence of reflective columns in a database table presents some interesting issues. First of all, reflective columns give rise to two different levels of metadata not know in the prior art. In the prior art, a database user is able to view metadata for a database that shows the user the structure of the database. The present invention includes the concept of multiple layers of metadata. The two levels of metadata that may be viewed according to the preferred embodiments are referred to herein as "application view" and "system view". The system view metadata shows all of the data stored in the database, similar to the display of metadata known in the prior art. However, a new level of metadata referred to herein as "application view metadata" is a presentation of metadata from the point of view of a particular type of application. As discussed in detail above, the database optimizer 127 may add reflective columns to a database to improve the performance of applications that access data in the database. The presence of the reflective columns may not be terribly important to an application developer, because it represents changes made to the database by the database manager 125 to enhance the performance of accessing data in the database, but does not affect the logic within the application. When the application developer requests to see metadata for the database, the metadata he or she may really be interested in may be the metadata that applies to the application view. In other words, the metadata that is specific to the type of application may be displayed, while the metadata that is specific to other types of applications may be hidden from view. In the preferred embodiments, a database administrator may determine whether the application view metadata or the system view metadata is displayed when the user requests the display of metadata for the database by specifying a customization setting. One example of such a customization setting is shown in the menu display window 1800 of FIG. 18, which gives the database administrator the ability to check either the "Application View" box or the "System View" box. With the "System View" box checked as shown in FIG. 18, the system view metadata is displayed to the database administrator when the function to display the metadata is invoked. If the "Application View" box is checked, only the metadata relating to a specific type of application is displayed, and any reflective columns for other types of applications will remain hidden.

Another interesting issue that arises due to the presence of reflective columns is the issue of data coherency between reflective columns. How can we assure that the data in two reflective columns are in sync? There are many ways to assure the data coherency between reflective columns. The first is to simply perform a write to both reflective columns when data in either is changed. Because read operations in a database typically far outnumber write operations, the performance penalty for having to write to two columns instead of one will be small. Another way to assure data coherency is to allow for one column to be marginally out of date while a background process copies the data from one reflective column to the other. Another way to assure data coherency is to define a "master column", which would ensure that one column would always be up to date, while the other could be marginally out of date. This is really a combination of the first two methods discussed above. If a write to the database changes a column that is not the master column, an immediate write to the master column will be performed to keep the master column up to date. If a write to the database changes the master column, other reflective column(s) may be marginally out of date and updated by a background process. Finally, another way to assure data coherency between reflective columns is to flag a column as dirty if its data is out of date. This allows for only a single update to happen immediately to one column, and the update to the reflective column may be done separately. However, if an application reads a column that has its dirty flag set (indicating it is out of date with the other column), the column will be immediately updated and the dirty bit cleared before doing the read. Of course, there are other methods that could also be used to assure data coherency between reflective columns in a database. The preferred embodiments expressly extend to any and all methods for maintaining data coherency between reflective columns in a database.

Figure 19:
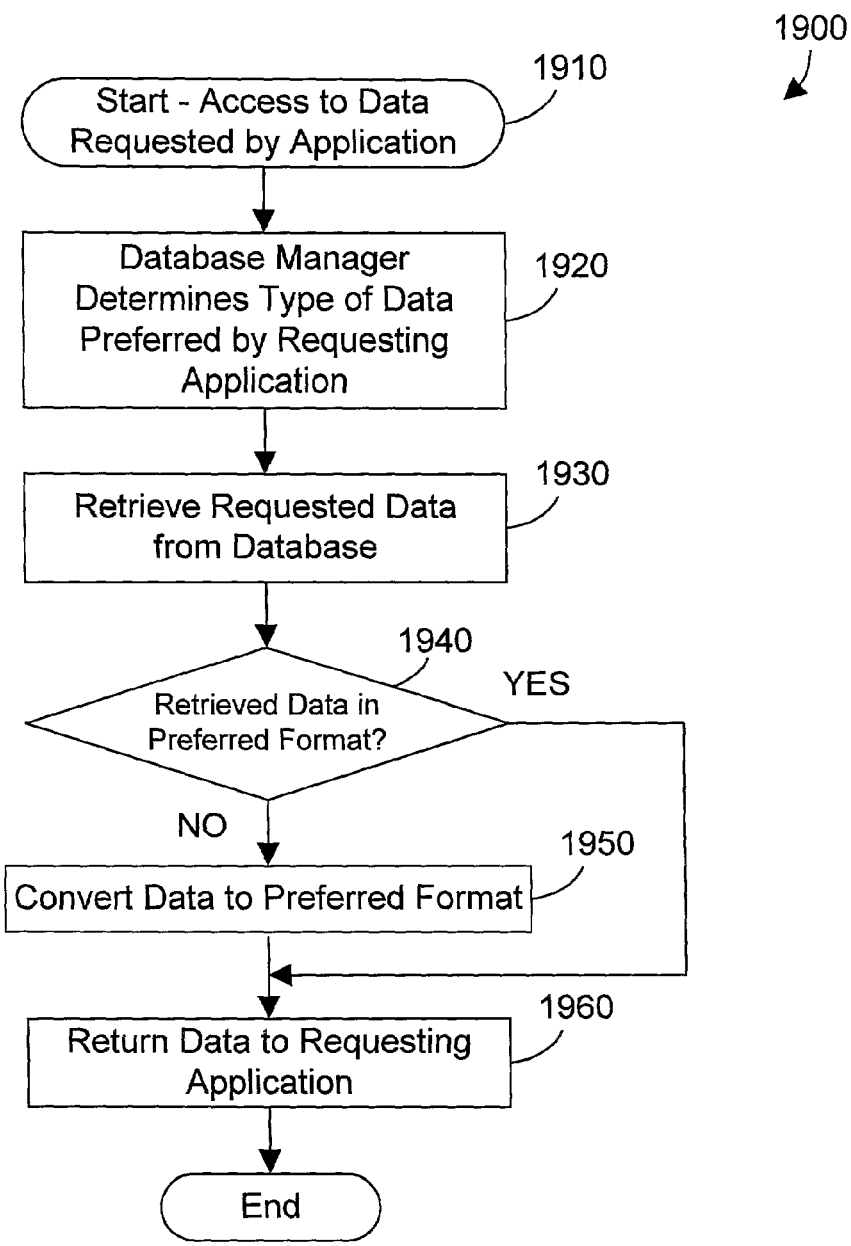
FIG. 19 is a flow diagram of a method for a database manager to provide data of the correct type to a requesting application.

One significant advantage of the preferred embodiments is that the database manager 125 returns data from the database in a format (i.e., of a data type) that matches the type of the requesting application, as determined by the API invoked to access the data, without performing as many conversions between data types as is required by the prior art. In the prior art, conversion between different data types is required whenever the data is stored in a format that is different than the format preferred by the requesting application. Referring to FIG. 19, a method 1900 in accordance with the preferred embodiments begins when access to data is requested by an application (step 1910). The database manager then determines the type of data preferred by the requesting application (step 1920). In one suitable implementation, this step is broken down into the steps of determining which API was invoked, and referring to the data access rules 128 to determine which data type is preferred for the type of API that was invoked. Once the preferred data type is determined in step 1920, the requested data is retrieved from the database (step 1930). If the retrieved data is in the preferred format (step 1940=YES), the data is returned to the requesting application without modification (step 1960). If the retrieved data is not in the preferred format (step 1940=NO), the data is converted to the preferred format (step 1950), and is returned to the requesting application (step 1960). A significant advantage of the preferred embodiments is to decrease the number of times conversion between data types is needed by changing the database to store data in a format optimized for the type of application that most frequently accesses the data. Thus, using the apparatus and method of the preferred embodiments, the performance of a database is increased by changing the database to reduce the number of times conversion is required between data types (e.g., in step 1950 of FIG. 19).

Figure 20:
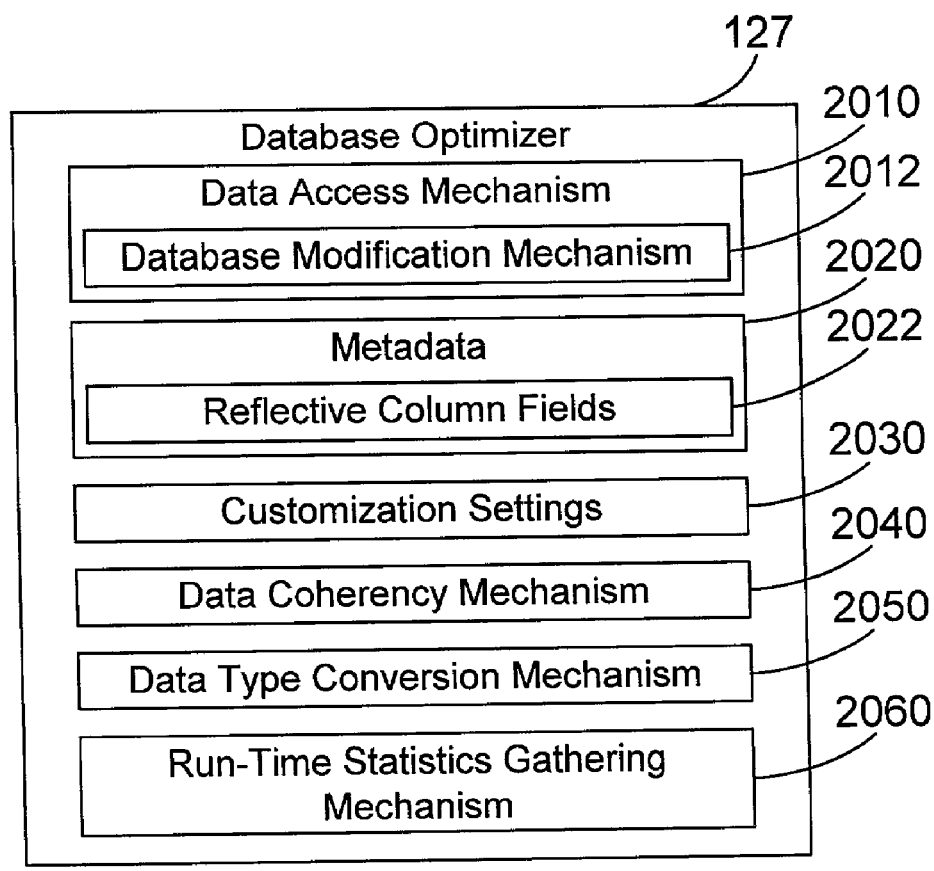
FIG. 20 is a block diagram of the database optimizer in FIG. 1.

The database optimizer 127 has been described extensively above. Many of its features may be summarized by the block diagram shown in FIG. 20. Database optimizer 127 includes a data access mechanism 2010 that performs the function of method 400 of FIG. 4, which allows a database to evolve according to the type of applications that access it. Data access mechanism 2010 includes a database modification mechanism 2012 that modifies the database schema to provide better performance. Database optimizer 127 also writes metadata 2020 (as shown in FIGS. 12–17) that includes reflective column fields 2022 that account for reflective columns, when present. Database optimizer 127 also includes customization settings 2030 that allow a system administrator to customize the function of the database optimizer 127. Several examples of suitable customization are described above, including those illustrated in FIGS. 5, 6, and 18. Data coherency mechanism 2040 is a mechanism that maintains coherency of data between reflective columns, as explained in detail above. Data type conversion mechanism 2050 is a mechanism that performs required conversions between data types before delivering data to the requesting applications, as described in method 1900 of FIG. 19. Run-time statistics gathering mechanism 2060 is a mechanism that tracks the frequency of accesses to columns in a database by different types of applications, and stores this information in run-time statistics 129 in FIG. 1. The block diagram of FIG. 20 shows that the database optimizer of the preferred embodiments includes many features not known in the prior art that provide significant performance advantages when compared to prior art techniques for accessing data in a database.

The preferred embodiments described herein allow a database to dynamically change over time to accommodate the applications accessing it. As shown by the simple example presented in FIGS. 7–9, a database table may be created with columns that are of data types that are optimized for a COBOL application. When other applications, such as Java applications, access a column, the data in the COBOL-optimized data type is converted to data in the Java-optimized data type before returning the data to the requesting Java application. This allows the Java applications to know they will receive data of the proper type, relieving the application of the chore of performing conversion between data types. As the number of accesses by Java applications passes a first threshold level, the database schema may be changed to add reflective columns that provide data in multiple data types. At the point in time when the number of accesses by Java applications exceeds a second threshold level, the original columns that contain the COBOL-optimized data types may be deleted from the database, and only the columns with the Java-optimized data type. When COBOL applications access a column in this evolved database, the data in the Java-optimized data type is converted to data in the COBOL-optimized data type before returning the data to the requesting COBOL application. The first and second threshold may be set at variable levels according to the needs of the database customer. In this manner, the database may be dynamically tuned to optimize the performance of applications that access the database most frequently. By changing the first and second threshold levels, the database designer may trade off the performance penalty of converting data between data types with the space required to store reflective columns in the database.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
at least one processor;
a memory coupled to the at least one processor;
a database optimizer residing in the memory and executed by the at least one processor, the database optimizer using statistics regarding the type of applications accessing data in a database, the frequency with which the applications access the data, and the location of the data being accessed by the applications to make at least one change to the database schema to optimize the performance of accessing data in the database;

wherein the change to the database schema comprises adding a new column of a second data type to the database that contains the same data in an existing column of a first data type in the database; and wherein the database optimizer further comprises a data coherency mechanism for maintaining data coherency between the existing column and the new column.

2. An apparatus comprising:

at least one processor;

a memory coupled to the at least one processor;

a database residing in the memory;

a database optimizer residing in the memory and executed by the at least one processor, the database optimizer comprising:

a data access mechanism that uses statistics regarding the type of applications accessing data in a database, the frequency with which the applications access the data, and the location of the data being accessed by the applications to make at least one change to the database schema to optimize the performance of accessing data in the database;

customization settings that may be set by a human user to determine the function of the database optimizer;

a data coherency mechanism that maintains coherency of reflective columns in the database that are created by the data access mechanism and that contain the same data in different data types; and a data type conversion mechanism that converts data in a first data type retrieved from the database to a second data type that is preferred by a requesting application.

3. An apparatus comprising:

at least one processor;

a memory coupled to the at least one processor;

a database residing in the memory;

a database optimizer residing in the memory and executed by the at least one processor, the database optimizer comprising:

a mechanism that reads statistics regarding the type of applications accessing data in the database, the frequency with which the applications access the data, and the columns being accessed by the applications;

if the statistics indicate that a selected type of application has a number of accesses to a selected column of a first data type in the database that exceeds a first threshold level, the database optimizer determines whether the statistics indicate that the selected type of application has a number of accesses to the selected column that exceeds a second threshold level, and if so, the database optimizer changes the data type of the selected column in the database;

if the statistics indicate that a selected type of application has a number of accesses to a selected column of a first data type in the database that exceeds a first threshold level, the data optimizer determines whether the statistics indicate that the selected type of application has a number of accesses to the selected column that exceeds a second threshold level, and if not, the data optimizer adds a new column of a second data type to the database that contains the same data in the selected column, the selected column and the new column being defined as reflective columns because they contain the same data in different data types;

wherein the data optimizer detects when one of the plurality of applications requests access to data in the selected column, determines the preferred data type for the requesting application, determines if the data in the selected column is of the preferred data type for the requesting application, and if the data in the selected column is of the preferred data type for the requesting application, returning the data in the selected column to the requesting application;

if the data in any column reflective of the selected column is of the preferred data type for the requesting application, the database optimizer returns the data from the reflective column to the requesting application;

if the data in the selected column and in all reflective columns, if any, is not of the preferred data type for the requesting application, the database optimizer converts the data to the preferred data type for the requesting application, and returns the converted data to the requesting application.

4. A computer-implemented method for optimizing a database comprising the steps of:

(1) determining a preferred data type for at least one of a plurality of applications that access the database;

(2) dynamically changing a schema for the database to provide the preferred data type when at least one of the plurality of applications requests access to data in the database; and wherein the step of dynamically changing the schema determines what change to make according to:

2A) the type of the plurality of applications accessing data in the database;

2B) the frequency with which the plurality of applications access the data; and 2C) the location of the data being accessed by the plurality of applications;

wherein the step of dynamically changing the schema for the database comprises the step of adding a new column of a second data type to the database that contains the same data in an existing column of a first data type in the database; and (3) maintaining data coherency between the existing column and the new column.

5. The method of claim 4 further comprising the step of gathering the statistics.

6. A computer-implemented method for reading data from a database comprising the steps of:

(1) specifying a preferred data type for at least one of a plurality of applications that access the database;

(2) detecting when one of the plurality of applications requests access to data in the database;

(3) determining the preferred data type for the requesting application;

(4) determining if the data is stored in the database in the preferred data type for the requesting application;

(5) if the data is stored in the database in the preferred data type for the requesting application, returning the data to the requesting application;

(6) if the data is not stored in the database in the preferred data type for the requesting application, performing the steps of:

(6A) converting the data to the preferred data type for the requesting application; and (6B) returning the converted data to the requesting application;

(7) reading statistics regarding the type of applications accessing data in the database, the frequency with which the applications access the data, and the location of the data being accessed by the applications; and (8) dynamically changing a schema for the database to provide the preferred data type when at least one of the plurality of applications requests access to data in the database.

7. The method of claim 6 further comprising the step of gathering the statistics.

8. The method of claim 6 wherein the step of dynamically changing the schema for the database comprises the step of changing the data type of at least one column in the database.

9. The method of claim 6 wherein the step of dynamically changing the schema for the database comprises the step of adding a new column of a second data type to the database that contains the same data in an existing column of a first data type in the database.

10. A computer-implemented method for optimizing accesses to a database comprising the steps of:

(1) reading statistics regarding the type of applications accessing data in the database, the frequency with which the applications access the data, and the columns being accessed by the applications;

(2) if the statistics indicate that a selected type of application has a number of accesses to a selected column of a first data type in the database that exceeds a first threshold level, performing the steps of:

(2A) if the statistics indicate that the selected type of application has a number of accesses to the selected column that exceeds a second threshold level, changing the data type of the selected column in the database;

(2B) if the statistics indicate that the selected type of application has a number of accesses to the selected column that does not exceed a second threshold level, adding a new column of a second data type to the database that contains the same data in the selected column, the selected column and the new column being defined as reflective columns because they contain the same data in different data types.

11. The method of claim 10 wherein the first and second threshold levels may be set by a human user via a user interface.

12. The method of claim 10 further comprising the step of maintaining coherency of data in the selected column and the new column.

13. The method of claim 10 further comprising the step of gathering the statistics.

14. The method of claim 10 farther comprising the steps of:

(3) specifying a preferred data type for at least one of a plurality of applications that access the database;

(4) detecting when one of the plurality of applications requests access to data in the selected column;

(5) determining the preferred data type for the requesting application;

(6) determining if the data in the selected column is of the preferred data type for the requesting application;

(7) if the data in the selected column is of the preferred data type for the requesting application, returning the data in the selected column to the requesting application;

(8) determining if the data in any column reflective of the selected column is of the preferred data type for the requesting application;

(9) if the data in a reflective column is of the preferred data type for the requesting application, returning the data from the reflective column to the requesting application;

(10) if the data in the selected column and in all reflective columns, if any, is not of the preferred data type for the requesting application, performing the steps of:

(10A) converting the data to the preferred data type for the requesting application; and (10B) returning the converted data to the requesting application.

15. A program product comprising:

(A) a database optimizer comprising:

a data access mechanism that uses statistics regarding the type of applications accessing data in a database, the frequency with which the applications access the data, and the location of the data being accessed by the applications to make at least one change to the database schema to optimize the performance of accessing data in the database;

customization settings that may be set by a human user to determine the function of the database optimizer;

a data coherency mechanism that maintains coherency of reflective columns in the database that are created by the data access mechanism and that contain the same data in different data types; and a data type conversion mechanism that converts data in a first data type retrieved from the database to a second data type that is preferred by the requesting application; and (B) computer-readable signal bearing media bearing the database optimizer.

16. The program product of claim 15 wherein the computer-readable signal bearing media comprises recordable media.

17. The program product of claim 15 wherein the computer-readable signal bearing media comprises transmission media.

18. A program product comprising:

(A) a database optimizer comprising:

a mechanism that reads statistics regarding the type of applications accessing data in the database, the frequency with which the applications access the data, and the columns being accessed by the applications;

if the statistics indicate that a selected type of application has a number of accesses to a selected column of a first data type in the database that exceeds a first threshold level, the database optimizer determines whether the statistics indicate that the selected type of application has a number of accesses to the selected column that exceeds a second threshold level, and if so, the database optimizer changes the data type of the selected column in the database;

if the statistics indicate that a selected type of application has a number of accesses to a selected column of a first data type in the database that exceeds a first threshold level, the data optimizer determines whether the statistics indicate that the selected type of application has a number of accesses to the selected column that exceeds a second threshold level, and if not, the data optimizer adds a new column of a second data type to the database that contains the same data in the selected column, the selected column and the new column being defined as reflective columns because they contain the same data in different data types;

wherein the data optimizer detects when one of the plurality of applications requests access to data in the selected column, determines the preferred data type for the requesting application, determines if the data in the selected column is of the preferred data type for the requesting application, and if the data in the selected column is of the preferred data type for the requesting application, returning the data in the selected column to the requesting application;

if the data in any column reflective of the selected column is of the preferred data type for the requesting application, the database optimizer returns the data from the reflective column to the requesting application;

if the data in the selected column and in all reflective columns, if any, is not of the preferred data type for the requesting application, the database optimizer converts the data to the preferred data type for the requesting application, and returns the converted data to the requesting application; and (B) computer-readable signal bearing media bearing the database optimizer.

19. The program product of claim 18 wherein the computer-readable signal bearing media comprises recordable media.

20. The program product of claim 18 wherein the computer-readable signal bearing media comprises transmission media.

* * * * *